US011237802B1

(12) United States Patent
Krishnamoorthy et al.

(10) Patent No.: US 11,237,802 B1
(45) Date of Patent: Feb. 1, 2022

(54) ARCHITECTURE DIAGRAM ANALYSIS TOOL FOR SOFTWARE DEVELOPMENT

(71) Applicant: Bank of America Corporation, Charlotte, NC (US)

(72) Inventors: MadhuSudhanan Krishnamoorthy, Chennai (IN); Sreeram Raghavan, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 16/933,783

(22) Filed: Jul. 20, 2020

(51) Int. Cl.
  *G06F 8/34* (2018.01)
  *G06F 8/36* (2018.01)
(52) U.S. Cl.
  CPC . *G06F 8/34* (2013.01); *G06F 8/36* (2013.01)
(58) Field of Classification Search
  CPC .................................................. G06F 8/34–36
  USPC ............. 717/105–110, 145–150; 706/42–48
  See application file for complete search history.

(56) References Cited

U.S. PATENT DOCUMENTS

| | | | | |
|---|---|---|---|---|
| 5,113,521 A | * | 5/1992 | McKeen | G06F 9/462 714/15 |
| 5,138,694 A | * | 8/1992 | Hamilton | G06N 5/043 706/52 |
| 5,325,298 A | * | 6/1994 | Gallant | G06F 16/355 704/9 |
| 5,371,883 A | | 12/1994 | Gross et al. | |
| 5,619,709 A | * | 4/1997 | Caid | G06F 16/58 715/209 |
| 5,754,860 A | | 5/1998 | McKeeman et al. | |
| 5,930,798 A | | 7/1999 | Lawler et al. | |
| 5,950,146 A | * | 9/1999 | Vapnik | G06F 17/17 702/153 |
| 6,002,869 A | | 12/1999 | Hinckley | |
| 6,219,829 B1 | | 4/2001 | Sivakumar et al. | |
| 6,301,701 B1 | | 10/2001 | Walker et al. | |
| 6,625,760 B1 | | 9/2003 | Man et al. | |

(Continued)

FOREIGN PATENT DOCUMENTS

WO  2006130846 A2  12/2006

OTHER PUBLICATIONS

Yue et al, "A Support Vector Method for Optimizing Average Precision", ACM, pp. 271-278 (Year: 2007).*

(Continued)

*Primary Examiner* — Anil Khatri

(57) ABSTRACT

A device configured to obtain an architecture diagram that includes features that are configured to form a workflow for a computer system. The device is further configured to identify the features within the architecture diagram and their metadata. The device is further configured to convert the features into vector points based on the metadata and to generate a vector map that associates vector points with their metadata. The device is further configured to input the vector points into a machine learning model and to obtain classification results for the vector points. The device is further configured to identify non-compliant features that correspond with vector points that are associated with a non-compliant classification. The device is further configured to identify alternative features for the non-compliant features, to update the vector map with the alternative features, and to update the architecture diagram based on the updated vector map.

20 Claims, 5 Drawing Sheets

(56) References Cited

U.S. PATENT DOCUMENTS

| | | |
|---|---|---|
| 6,651,240 B1 | 11/2003 | Yamamoto et al. |
| 6,725,399 B1 | 4/2004 | Bowman |
| 6,804,796 B2 | 10/2004 | Gustavsson et al. |
| 6,957,186 B1 | 10/2005 | Guheen et al. |
| 6,968,544 B1 | 11/2005 | Schneider |
| 6,986,125 B2 | 1/2006 | Apuzzo et al. |
| 7,076,764 B2 | 7/2006 | Kramer |
| 7,251,637 B1 * | 7/2007 | Caid .................. G06K 9/4623 706/15 |
| 7,275,184 B2 | 9/2007 | Wolff et al. |
| 7,472,374 B1 | 12/2008 | Dillman et al. |
| 7,542,959 B2 * | 6/2009 | Barnhill ............... G06N 20/00 706/48 |
| 7,599,897 B2 * | 10/2009 | Hartman ............... G05B 13/048 706/15 |
| 7,630,945 B2 * | 12/2009 | Selvaraj ............... G06K 9/6269 706/45 |
| 7,716,254 B2 | 5/2010 | Sarkar et al. |
| 8,028,269 B2 | 9/2011 | Bhatia et al. |
| 8,095,483 B2 * | 1/2012 | Weston ................. G16B 25/10 706/12 |
| 8,463,718 B2 * | 6/2013 | Ben-Hur ............... G06K 9/6215 706/12 |
| 8,677,316 B2 | 3/2014 | Dutta et al. |
| 10,310,821 B2 * | 6/2019 | Brown .................. G06N 20/00 |
| 10,373,078 B1 * | 8/2019 | Agarwal ............... G06N 20/00 |
| 10,546,245 B2 * | 1/2020 | Virkar .................. G06K 9/6232 |
| 10,803,392 B1 * | 10/2020 | Khan ..................... H04L 67/10 |
| 10,838,699 B2 * | 11/2020 | Dayanandan ............. G06F 8/10 |
| 10,853,536 B1 * | 12/2020 | Steingrimsson ........ G06F 30/20 |
| 10,936,962 B1 * | 3/2021 | Neumann ................ G06N 5/02 |
| 2002/0073403 A1 | 6/2002 | Fleehart et al. |
| 2002/0162091 A1 | 10/2002 | Crocker |
| 2003/0058277 A1 | 3/2003 | Bowman-Amuah |
| 2003/0188299 A1 | 10/2003 | Broughton et al. |
| 2003/0204346 A1 | 10/2003 | Kennedy et al. |
| 2003/0204784 A1 | 10/2003 | Jorapur |
| 2004/0015377 A1 | 1/2004 | Hostetler |
| 2004/0107125 A1 | 6/2004 | Guheen et al. |
| 2004/0143819 A1 | 7/2004 | Cheng et al. |
| 2004/0153830 A1 | 8/2004 | Cebula et al. |
| 2004/0205508 A1 | 10/2004 | Wecker et al. |
| 2005/0015675 A1 | 1/2005 | Kolawa et al. |
| 2005/0102660 A1 | 5/2005 | Chen et al. |
| 2005/0114830 A1 | 5/2005 | Knutson et al. |
| 2005/0183055 A1 | 8/2005 | Herrera |
| 2005/0198618 A1 | 9/2005 | Lalonde et al. |
| 2006/0064178 A1 | 3/2006 | Butterfield et al. |
| 2006/0064570 A1 | 3/2006 | di Savoia |
| 2006/0136863 A1 | 6/2006 | Szpak |
| 2006/0200803 A1 | 9/2006 | Neumann et al. |
| 2006/0229859 A1 | 10/2006 | Srouji et al. |
| 2007/0011654 A1 | 1/2007 | Opperman |
| 2007/0028110 A1 | 2/2007 | Brennan |
| 2007/0256058 A1 | 11/2007 | Marfatia et al. |
| 2008/0229292 A1 | 9/2008 | Matsa et al. |
| 2008/0294396 A1 | 11/2008 | Hsu et al. |
| 2009/0187879 A1 | 7/2009 | Ao et al. |
| 2009/0254877 A1 | 10/2009 | Kuriakose et al. |
| 2009/0300579 A1 | 12/2009 | Dutta et al. |
| 2016/0364909 A1 | 12/2016 | Cuplin et al. |

OTHER PUBLICATIONS

Han et al, "A Multi-level Data Structure for Vector Maps", ACM, pp. 214-221 (Year: 2004).*

Syed et al, "A Study of Support Vectors on Model Independent Example Selection", ACM, pp. 272-276 (Year: 1999).*

Lim, "Applying Code Vectors for Presenting Software Features in Machine Learning", IEEE, pp. 803-804 (Year: 2018).*

Brochier et al., "Global Vectors for Node Representations", ACM, pp. 2587-2593 (Year: 2019).*

Loukas et al, "A Machine Learning Approach for NILM based on Odd Harmonic Current Vectors", IEEE, pp. 1-6 (Year: 2019).*

Henkel et al, "Code Vectors: Understanding Programs Through Embedded Abstracted Symbolic Traces", ACM, pp. 163-174 (Year: 2018).*

* cited by examiner

ARCHITECTURE DIAGRAM ANALYSIS TOOL FOR SOFTWARE DEVELOPMENT

TECHNICAL FIELD

The present disclosure relates generally to software development, and more specifically to an architecture diagram analysis tool for software development.

BACKGROUND

Existing computer systems are constantly changing to keep up with a consumer's needs. Hardware and software components may be continuously added, removed, or modified as the needs of a computer system evolves. The continuous evolution of a computer system poses a technical challenge because issues may arise as changes are made to the computer system. Identifying and resolving these types of issues in large computer systems is a difficult and time-consuming task which results in a significant amount of downtime for the computer system and reduces the throughput of the computing system while the system is being repaired. Issues within a computer system may be unique to the configuration of components within the system infrastructure and they may arise due to any number of variables. This means that each issue requires a sufficient amount of time to troubleshoot and resolve. This downtime also has a detrimental effect on the performance and throughput of other computer systems that rely on data from the computer system.

SUMMARY

The system disclosed in the present application provides a technical solution to the technical problems discussed above by detecting issues within a computer system using architecture diagrams and autonomously resolving these issues. For example, a computer system may experience error codes, data errors, data loss, slow response times, an increase in processor usage, a decrease in available memory, a decrease in available bandwidth, a decrease in data throughput, or any other type of decrease of performance. Examples of issue sources include, but are not limited to, non-compliant components and non-scalable components. The disclosed system provides the ability to detect and resolve any issues that affect the performance of the computer system. The disclosed system provides several practical applications and technical advantages which include a process for extracting information from an architecture diagram, using a combination of unsupervised learning and supervised learning techniques to detect issues within a computer system based on the information from the architecture diagram, and identifying solutions for resolving any detected issues. This process allows the computer system to use unsupervised learning on the information from an architecture diagram to initially determine whether any issues are present in the architecture diagram. In response to determining that an issue is present in the architecture diagram, the computer system is then able to use supervised learning to identify the features within the architecture diagram that are associated with an issue and to identify solutions (e.g. alternative features) for resolving any issues.

In existing computer systems, the source for issues such as a decrease in performance may not be easily detectable. This means that the computer system will experience a decrease in performance, for example, a decrease in throughput, until the source of the issue has been determined. Once the source of an issue has identified, then the computer system will need to be at least partially shut down to allow a network operator to make repairs to the computer system. This shutdown results in downtime where the computer system may operate in a limited capacity. In contrast, the process disclosed in the present application allows the computer system to quickly detect an issue within the computer system, to identify a source of the issue, and to autonomously implement a solution to resolve the issue. By reducing the amount of time required to detect an issue and its source, the computer system is able to reduce the amount of time that the computer system operates with degraded performance. In addition, by autonomously identifying and implementing a solution, the computer system is able to reduce the amount of time it takes to resolve an issue within the computer system which reduces the amount of downtime that the computer system will experience. By reducing the amount of downtime that the computer system experiences, the computer system is able to spend more time operating at its full capacity so that the computer system can maintain a higher throughput and improve the utilization of the computer system.

In one embodiment, the system comprises a device that is configured to obtain an architecture diagram. The architecture diagram is a graphical representation that includes features that are configured to form a workflow for a computer system or a software development project. The features may include software components, hardware components, and communication channels between various components. The device is further configured to identify the features within the architecture diagram and to identify metadata that is associated with the identified features. The metadata may comprise feature identifiers, text associated with the identified features, location information for the identified features within the architecture diagram, or any other suitable type of information that is associated with the features. The device is further configured to convert the identified features into vector points based on the identified metadata. A vector point is a point in an n-dimensional space where the number of dimensions in the n-dimensional space is based on the number of features in the architecture diagram. By converting the features into vector points, the device is able to analyze the features in a common domain which allows the device to determine how the features are associated with each other. The device is further configured to generate a vector map that associates the vector points with their corresponding metadata.

The device is further configured to input the vector points into the machine learning model and to obtain classification results for the vector points in response to inputting the vector points into the machine learning model. The machine learning model is trained to determine whether a feature is compliant, non-compliant, scalable, non-scalable, and/or any other suitable type of classification based on its vector point that is provided to the machine learning model. As an example, the device may be configured to identify vector points that are associated with a non-compliant classification and to identify non-compliant features that correspond with the vector points that are associated with a non-compliant classification. The device is further configured to identify alternative features for the non-compliant features, to update the vector map by replacing the non-compliant features with the alternative features, and to update the architecture diagram based on the updated vector map. Once the architecture diagram has been updated, the device may facilitate implementing the updated architecture diagram to resolve any of the issues that were previously detected. For example, the device may provide instructions for replacing features that are associated with issues with the identified alternative features.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

System Overview

Figure 1:
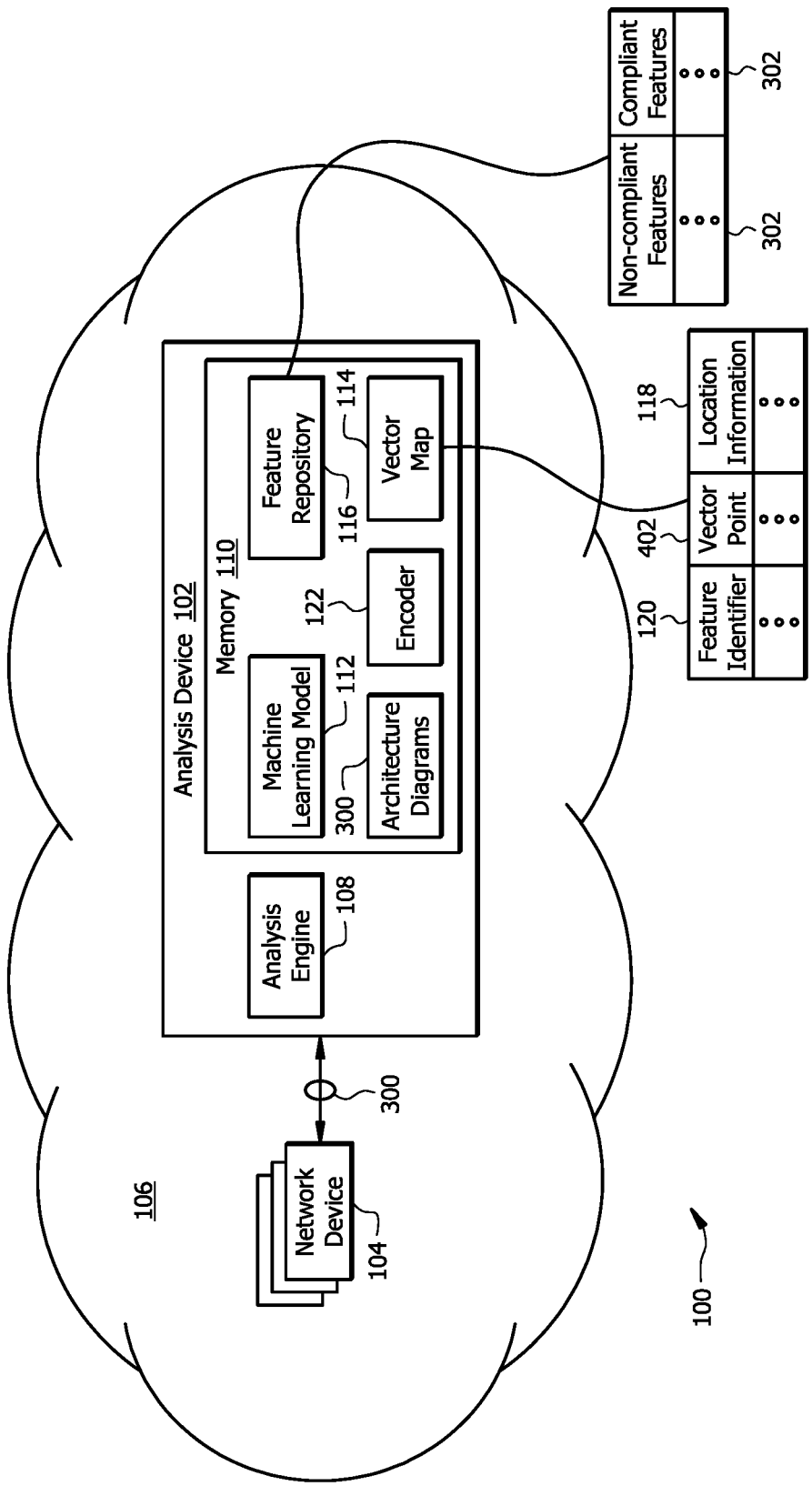
FIG. 1 is a schematic diagram of an architecture diagram analysis system.

FIG. 1 is a schematic diagram of an architecture analysis system 100. In one embodiment, the system 100 comprises an analysis device 102 that is in signal communication with one or more network devices 104 within a network 106. Examples of network devices 104 include, but are not limited to, computers, laptops, tablets, smartphones, databases, memories, servers, or any other suitable type of networking device. The network devices 104 may be configured to form one or more workflows for processing data for the system 100.

The network 106 may be any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 106 may be configured to support any suitable type of communication protocol as would be appreciated by one of ordinary skill in the art. In FIG. 1, the analysis device 102 is shown as a separate device from the network device 104. In other embodiments, the analysis device 102 may be integrated with a network device 104.

Analysis Device

The analysis device 102 is generally configured to analyze the features 302 within an architecture diagram 300 to determine whether the architecture diagram 300 contains any issues. Examples of issues include, but are not limited to, non-compliant features 302a and non-scalable features 302b. The analysis device 102 is further configured to identify alternative features 302 for any features 302 that are associated with an issue and to update the architecture diagram with the alternative features 302.

The analysis device 102 comprises an analysis engine 108 and a memory 110. The analysis device 102 may be configured as shown or in any other suitable configuration. Additional information about the hardware configuration of the analysis device 102 is described in FIG. 5. The memory 110 is configured to store machine learning models 112, vector maps 114, a feature repository 116, architecture diagrams 300, an encoder 122, and/or any other suitable type of data.

Figure 3:
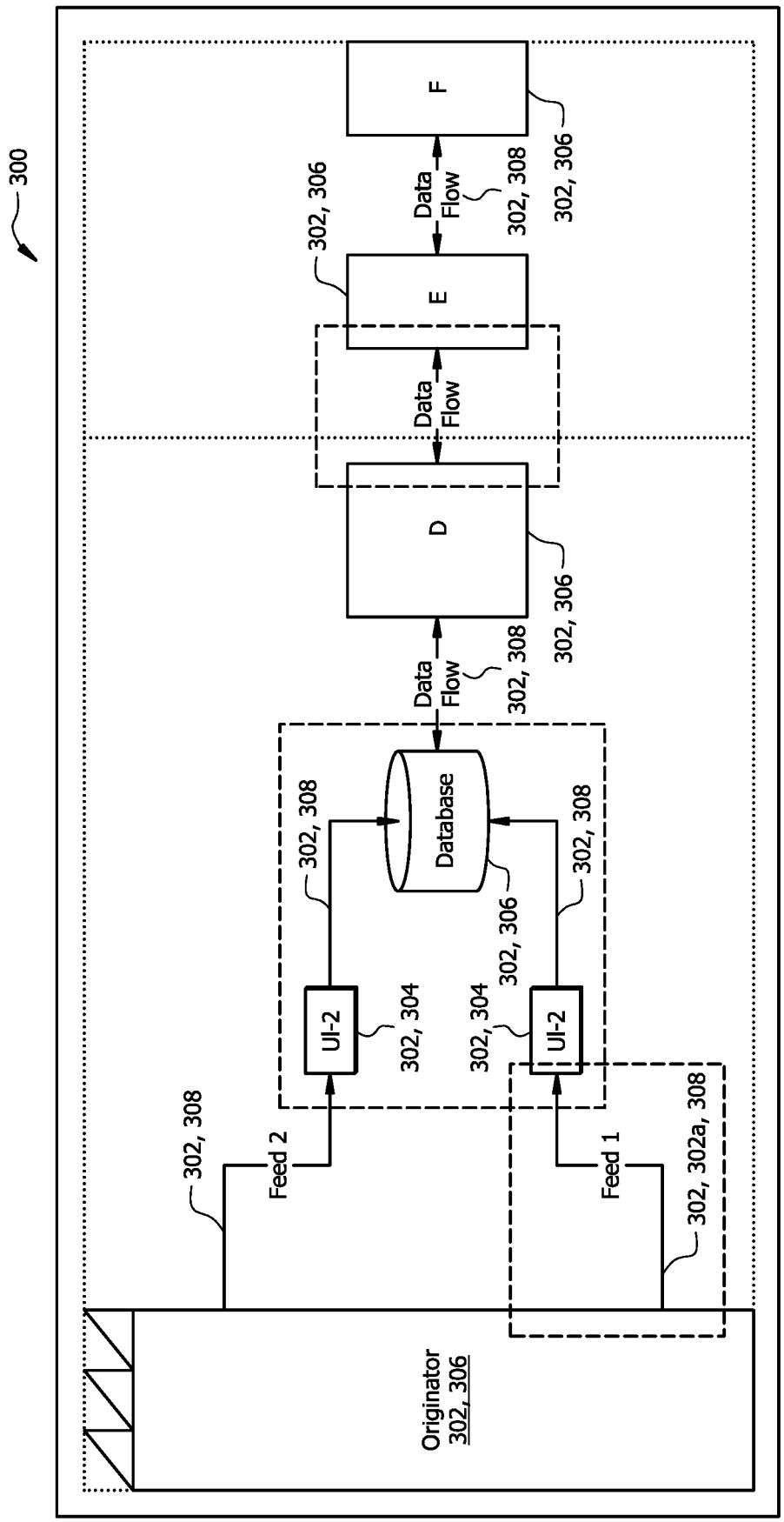
FIG. 3 is an example of an architecture diagram.

An example of an architecture diagram 300 is shown in FIG. 3. Referring to the example in FIG. 3, an architecture diagram 300 is a graphical representation of a workflow for a computer system (e.g. system 100) or a software development project. For example, an architecture diagram 300 may illustrate the software components (e.g. applications) and hardware components that are associated with performing an operation. For instance, an architecture diagram 300 may illustrate a workflow for the communication between a mobile application and a server. An architecture diagram 300 comprises graphical representations of a plurality of features 302. A feature 302 may correspond with a software component 304, a hardware component 306, or a communication channel 308 between components. Each feature 302 is associated with metadata that provides information about the feature 302. Examples of metadata include, but are not limited to, a feature identifier 120, location information 118 for a feature 302, and/or any other suitable type of information that is associated with a feature 302. The feature identifier 120 is an identifier (e.g. an alphanumeric identifier) that uniquely identifies a feature 302.

Figure 4:
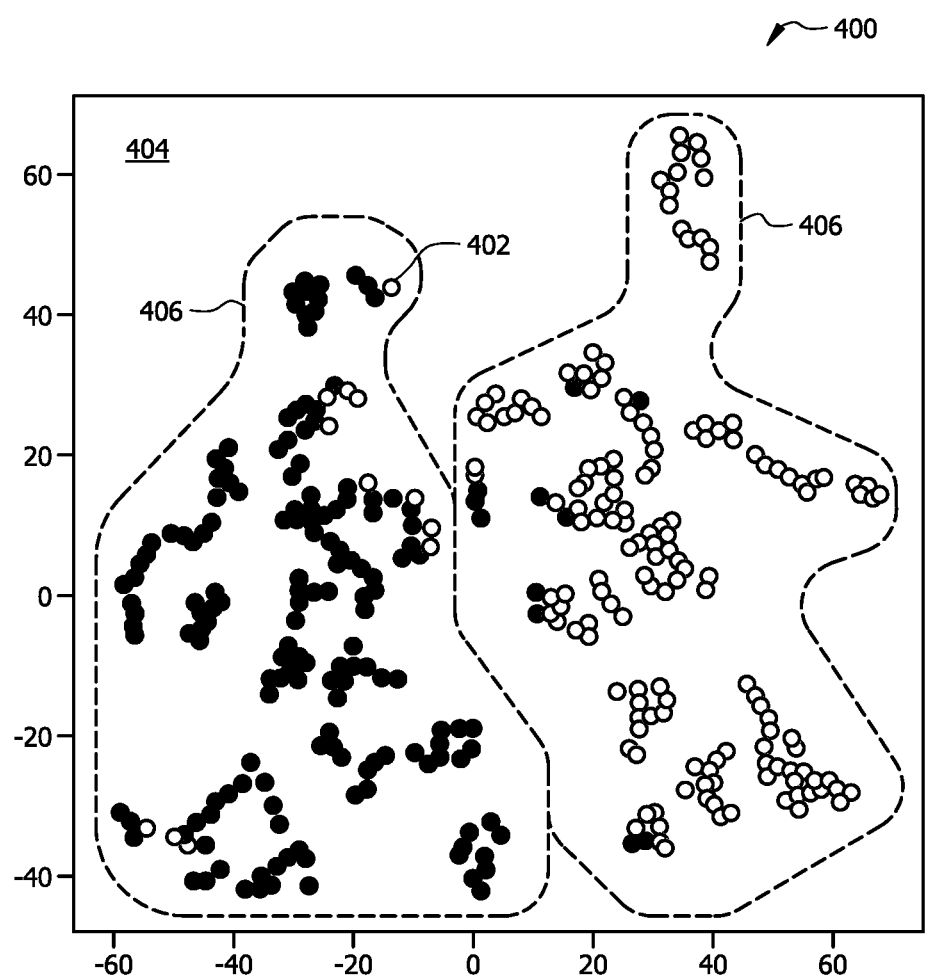
FIG. 4 is an example of results from a clustering analysis of vector points.

The encoder 122 is configured to convert a feature 302 into a vector point 402. For example, the encoder 122 may be configured to receive a feature identifier 120 as an input and to output a vector point 402 based on the input feature identifier 120. In one embodiment, the encoder 122 is configured to one-hot encode the features 302 into a vector point 402. For example, using one-hot encoding, a vector point 402 may be represented numerically as an ordered n-bit array of binary values. The number of bits in the array may correspond with the number of features 302 that are present in the architecture diagram 300. In this example, each bit in the bit array corresponds with a different feature 302 from among a list of features 302 that are present in the architecture diagram 300. As an example, the encoder 122 may convert a feature 302 to a vector point 402 by setting the bit that corresponds with the feature 302 to a value of one and setting the bits of the other features 302 to a value of zero. As another example, the encoder 122 may convert a feature 302 to a vector point 402 based on at least a portion of the metadata that is associated with the feature 302. For instance, the encoder 122 may employ pre-contextual word embedding techniques, pre-trained word embedding techniques, or any other suitable techniques with the metadata for a feature 302 to convert the feature 302 into a vector point 402. Vector points 402 are used to determine how a feature 302 is related to other features 302 in an architecture diagram 300. An example of vector points 402 is shown in FIG. 4. An example of using vector points 402 is described in FIG. 2.

A vector map 114 is configured to link together information that is associated with features 302 in an architecture diagram 300. In one embodiment, the vector map 114 is configured to associate a feature identifier 120 with location information 118 and a vector point 402. The location information 118 comprises information about where the feature 302 is located within an architecture diagram 300. As an example, the location information 118 may identify a location of a feature 302 with respect to other features 302 in an architecture diagram 300. For instance, the location information 118 may identify other features 302 that are connected as inputs and outputs to a feature 302. In other examples, the location information 118 may comprise any other suitable type of information for locating a feature 302 within an architecture diagram 300. In other embodiments, the vector map 114 may be configured to link together any other suitable type of information that is associated with a feature 302.

Examples of machine learning models 112 include, but are not limited to, a multi-layer perceptron or any other suitable type of neural network model. The machine learning model 112 is generally configured to classify features 302 of an architecture diagram 300. The machine learning model 112 is configured to receive a vector point 402 for a feature 302 as an input and to output a classification for the feature 302 based on the input vector point 402. The machine learning model 112 may be configured to classify a feature 302 as compliant, non-compliant, scalable, non-scalable, or any other suitable type of classification. The machine learning model 112 has been previously trained using training data. During the training process, the machine learning model 112 determines weight and bias values that allow the machine learning model 112 to map vector points 402 to different classifications. Through this process, the machine learning model 112 is able to identify how to classify features 302 from an architecture diagram 300. The analysis engine 108 may train the machine learning model 112 using any suitable technique as would be appreciated by one of ordinary skill in the art.

A feature repository 116 is configured to associate non-compliant features 302 with compliant features 302. For example, the feature repository 116 may comprise a mapping between feature identifiers 120 of non-compliant features 302 and feature identifiers 120 of compliant features 302. In some embodiments, the feature repository 116 may be generated and updated by system architects. For example, a system architect may initially build the feature repository 116 to create a mapping between non-compliant features 302 and compliant features 302. Over time, the system architect may periodically update the feature repository 116 to include additional mappings or to revise mappings between non-compliant features 302 and compliant features 302.

Analysis Engine

The analysis engine 108 is generally configured to analyze the features 302 within an architecture diagram 300 by converting the features 302 into vector points 402. The analysis engine 108 is further configured to perform a clustering analysis and/or a classification analysis on the vector points 402 to identify any features 302 that are associated with an issue. The analysis device 102 is further configured to identify alternative features 302 for any features 302 that are associated with an issue and to update the architecture diagram with the alternative features 302. In one embodiment, after the architecture diagram 300 has been updated, the analysis engine 108 may also facilitate implementing the updated architecture diagram 300 to resolve any of the issues that were previously detected. For example, the analysis engine 108 may provide instructions or commands for replacing features 302 that are associated with issues with the identified alternative features 302. An example of the analysis engine 108 in operation is described in FIG. 2.

Architecture Analysis Process

Figure 2:
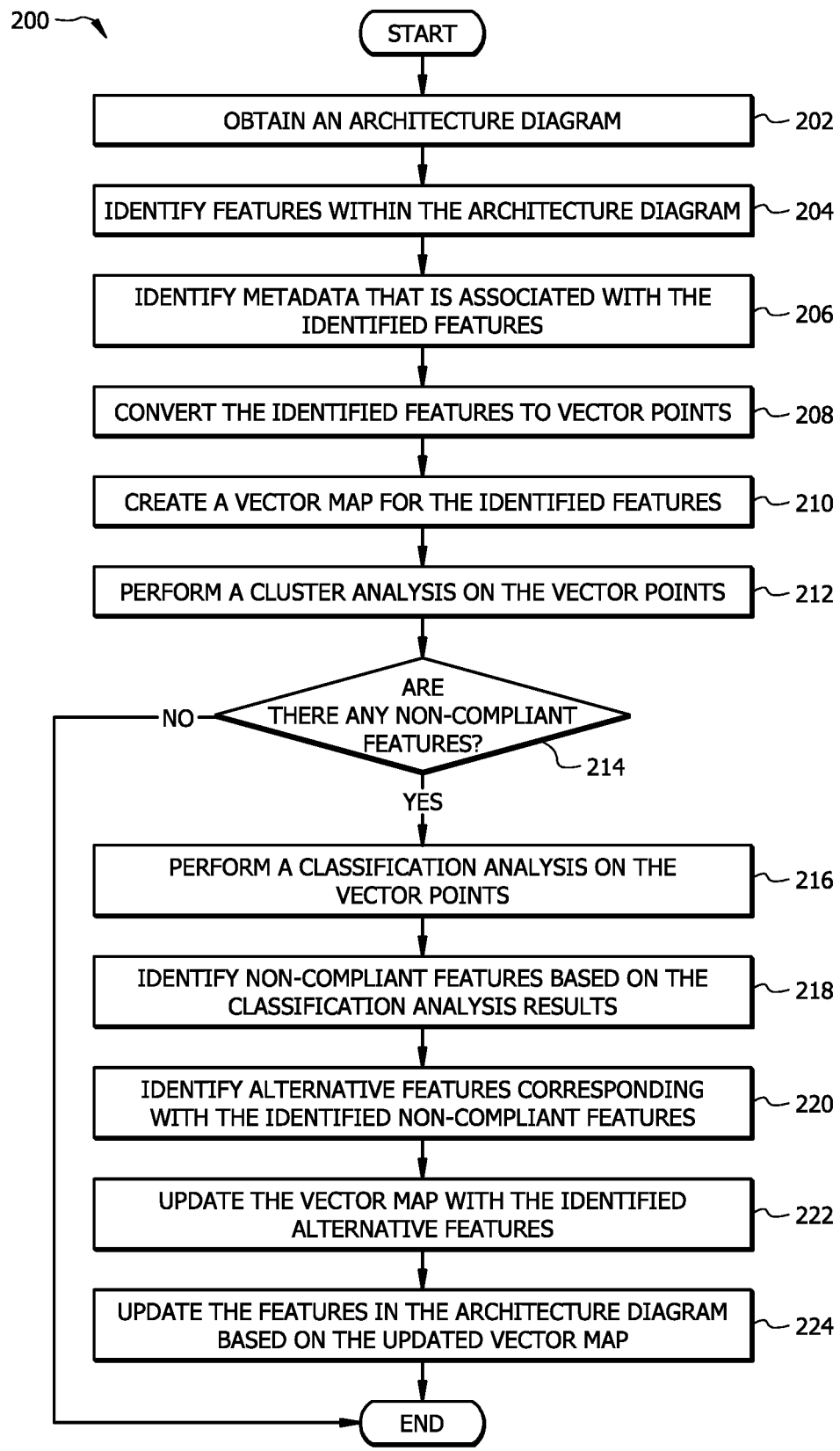
FIG. 2 is a flowchart of an embodiment of an architecture diagram analysis method.

FIG. 2 is a flowchart of an embodiment of an architecture diagram analysis method 200. The analysis device 102 may employ method 200 to analyze the features 302 within an architecture diagram 300 to determine whether the architecture diagram 300 contains any issues. The analysis device 102 is further configured to identify alternative features 302 for any features 302 that are associated with an issue and to update the architecture diagram with the revised features 302. This process reduces the amount of time it takes to detect an issue within the system 100. By reducing the amount of time required to detect an issue and its source, the analysis device 102 is able to reduce the amount of time that the system 100 operates with degraded performance. In addition, by autonomously identifying and implementing a solution, the analysis device 102 is able to reduce the amount of time it takes to resolve an issue within the system 100 which reduces the amount of downtime that the system 100 will experience. By reducing the amount of downtime that the system 100 experiences, this means that the system 100 is able to spend more time operating at its full capacity which means that the system 100 can maintain a higher throughput and improve the utilization of the system 100.

At step 202, the analysis engine 108 obtains an architecture diagram 300. In one embodiment, the analysis engine 108 may receive an architecture diagram 300 from a network device 104 for processing. As an example, the analysis engine 108 may receive the architecture diagram 300 from the network device 104 to determine whether the architecture diagram 300 includes any non-compliant features 302. In other examples, the analysis engine 108 may also determine whether the architecture diagram 300 includes features 302 that are associated with any other kind of issue such as scalability. As another example, the analysis engine 108 may receive the architecture diagram 300 as an input from a user that is using the analysis device 102. As another example, the analysis engine 108 may periodically retrieve an architecture diagram 300 from memory or database for analysis. In this case, the analysis engine 108 may be configured to monitor the architecture diagrams 300 that are stored in memory to determine whether any of the architecture diagrams 300 include features 302 that are associated with an issue. This process allows the analysis engine 108 to monitor the current state of the computer system to detect any issues.

At step 204, the analysis engine 108 identifies features 302 within the architecture diagram 300. In one embodiment, the analysis engine 108 may use an Application Programming Interface (API) to communicate with the software that is used to generate the architecture diagram 300. For example, the analysis engine 108 may use API calls to request information about the features 302 that are present in an architecture diagram 300. In some embodiments, the analysis engine 108 may use image processing, natural language processing, or any other suitable techniques to identify the features 302 that are present in the architecture diagram 300.

At step 206, the analysis engine 108 identifies metadata that is associated with the identified features 302. In one embodiment, the analysis engine 108 may also use API calls to request the metadata that is associated with the features 302 that are present in the architecture diagram 300. The metadata may comprise a feature identifier 120, location information 118, information about how a feature 302 is graphically represented, or any other suitable type of information that is associated with a feature 302.

At step 208, the analysis engine 108 converts the identified features 302 into vector points 402. In one embodiment, the analysis engine 108 uses an encoder 122 to convert a feature 302 into a vector point 402. The encoder 122 is configured to receive a feature identifier 120 as an input and to output a vector point 402 based on the input feature identifier 120. This process allows the analysis engine 108 to one-hot encode the features 302 into a vector point 402. In one embodiment, a vector point 402 may be represented numerically as an ordered n-bit array of binary values. In one example, the number of bits in the array may correspond with the number of features 302 that are present in the architecture diagram 300. In this example, each bit in the bit array corresponds with a feature 302 from among a list of features 302 that are present in the architecture diagram 300. The encoder 122 may convert a feature 302 to a vector point 402 by setting the bit that corresponds with the feature 302 to a value of one and setting the bits of the other features 302 to a value of zero. As another example, the encoder 122 may convert a feature 302 to a vector point 402 based on at least a portion of the metadata that is associated with the feature 302. For instance, the encoder 122 may employ pre-contextual word embedding techniques, pre-trained word embedding techniques, or any other suitable techniques with the metadata for a feature 302 to convert the feature 302 into a vector point 402.

At step 210, the analysis engine 108 creates a vector map 114 for the identified features 302. The vector map 114 is configured to associate the generated vector points 402 with their corresponding metadata. For example, analysis engine 108 may create entries in a vector map 114 that associate a feature identifier 120 with its location information 118 and vector point 402. In other examples, the analysis engine 108 may also associate features 302 with any other suitable type of information that is related to a feature 302.

At step 212, the analysis engine 108 performs a cluster analysis on the vector points 402. In one embodiment, the analysis engine 108 begins a clustering analysis by plotting the vector points 402 from the vector map 114 within the n-dimensional space 404. Referring to FIG. 4 as an example, a plurality of vector points 402 are plotted within the n-dimensional space 404. The numeric value of a vector point 402 corresponds with the location of the vector point 402 within the n-dimensional space 404. After the vector points 402 have been plotted in the n-dimensional space 404, the analysis engine 108 may use k-nearest neighbors or any other suitable clustering technique to identify clusters 406 among the vector points 402. This process allows the analysis engine 108 to determine the number of clusters 406 that are present within the generated plot. In the example shown in FIG. 4, the analysis engine 108 determines that there are two clusters 406.

At step 214, the analysis engine 108 determines whether there are any non-compliant features 302. Here, the analysis engine 108 compares the number of clusters 406 in the plot to a predetermined threshold value to determine whether the number of clusters 406 in the plot exceeds the predetermined threshold value. The predetermined threshold value is a maximum number of clusters 406 that can be present in a plot to have only compliant features 302. As an example, the predetermined threshold value may be set to one. This means that the analysis engine 108 will determine that non-compliant features 302 are present when there is more than one cluster 406 in the plot. In this example, the analysis engine 108 determines that the number of clusters 406 in the plot exceeds the predetermined threshold value which means that there are non-compliant features 302 present. In other examples, the predetermined threshold value may be set to any other suitable value.

The analysis engine 108 terminates method 200 in response to determining that there are no non-compliant features 302. In this case, the analysis engine 108 does not identify any non-compliant features 302. This means that all of the features 302 within the architecture diagram 300 are compliant and no further analysis is required.

The analysis engine 108 proceeds to step 216 in response to determining that there is at least one non-compliant feature 302a. In this case, the analysis engine 108 determines that non-compliant features 302 are present in the architecture diagram 300. The analysis engine 108 will further process the features 302 using a classification analysis to identify the non-compliant features 302.

At step 216, the analysis engine 108 performs a classification analysis on the vector points 402. The analysis engine 108 may perform a classification analysis on the vector points 402 by inputting the vector points 402 into the machine learning model 112. The analysis engine 108 receives classification results for the vector points 402 in response to inputting the vector points 402 into the machine learning model 112. In the classification results, each vector point 402 is associated with one or more classifications. For example, a vector point 402 may be classified as compliant, non-compliant, scalable, non-scalable, or any other suitable type of classification.

At step 218, the analysis engine 108 identifies non-compliant features 302 based on the classification analysis results. Here, the analysis engine 108 identifies features 302 that are associated with a non-compliant classification based on their vector point 402 For example, the analysis engine 108 may identify any vector points 402 that are associated with a non-compliant classification. The analysis engine 108 may then use the identified vector points 402 to look up their corresponding features 302 in the vector map 114. For instance, the analysis engine 108 may use a vector point 402 as a search token with the vector map 114 to identify a feature 302 in the vector map 114 that is linked with the vector point 402. The analysis engine 108 may repeat this process to identify all of the features 302 that are associated with a non-compliant classification.

In some embodiments, the analysis engine 108 may highlight the non-compliant features 302 within the architecture diagram 300. For example, the analysis engine 108 may identify location information 118 for the non-compliant features 302 in the vector map 114 and then modify the graphical representation of the non-compliant features 302 in the architecture diagram 300. For instance, the analysis engine 108 may overlay a color onto a non-compliant feature 302a, modify the font of a non-compliant feature, or use any other suitable technique to distinguish non-compliant features 302 from compliant features 302. This process provides a visual indication to a user about which features 302 in the architecture diagram 300 are non-compliant. Referring again to the example in FIG. 3, the analysis engine 108 may use an overlay to highlight a first non-compliant feature 302a and a second non-compliant feature 302a. In other examples, the analysis engine 108 may use any other suitable type of graphical representation to highlight non-compliant features 302a.

Returning to FIG. 2 at step 220, the analysis engine 108 identifies alternative features 302 that correspond with the identified non-compliant features 302. Here, the analysis engine 108 may use the feature repository 116 to identify alternative features 302 that correspond with the non-compliant features 302. For example, the analysis engine 108 may use a feature identifier 120 for a non-compliant feature 302a as a search token to look up alternative features 302 in the feature repository 116. The analysis engine 108 may repeat this process to identify alternative features 302 for all of the identified non-compliant features 302.

At step 222, the analysis engine 108 updates the vector map 114 with the identified alternative features 302. The analysis engine 108 may update the vector map 114 by replacing non-compliant features 302 with a corresponding alternative feature 302. For example, the analysis engine 108 may modify an entry in the vector map 114 to indicate an alternative feature 302 that can be used to replace a non-compliant feature 302a. For instance, the analysis engine 108 may replace the feature identifier 120 for the non-compliant feature 302a with a feature identifier 120 for the alternative feature 302. As another example, the analysis engine 108 may append an entry in the vector map 114 with information about the alternative feature 302 that corresponds with a non-compliant feature 302a.

At step 224, the analysis engine 108 updates the features 302 in the architecture diagram 300 based on the updated vector map 114. Here, the analysis engine 108 replaces non-compliant features 302 in the architecture diagram 300 with the compliant alternative features 302. For instance, the analysis engine 108 may identify location information 118 for non-compliant features 302 in the vector map 114. The analysis engine 108 may then identify a graphical representation of a non-compliant feature 302a in the architecture diagram 300 based on the location information 118 and then replace the graphical representation with a new graphical representation for a compliant alternative feature 302. As an example, the analysis engine 108 may identify a line in the architecture diagram 300 that corresponds with a non-compliant communication channel. The analysis engine 108 may replace the identified line with another line that corresponds with a compliant communication channel. As another example, the analysis engine 108 may identify a shape (e.g. a box) in the architecture diagram 300 that corresponds with a non-compliant component (e.g. software component 304 or hardware component 306). The analysis engine 108 may replace the identified shape with another shape that corresponds with a compliant component. The analysis engine 108 may repeat this process to replace all of the non-compliant features 302 in the architecture diagram 300 with compliant features 302. The analysis engine 108 may send the updated architecture diagram 300 back to the network device 104 that requested the analysis. In some embodiments, the analysis engine 108 will output the updated architecture diagram 300 on a graphical user interface.

In one embodiment, after the architecture diagram 300 has been updated, the analysis engine 108 may also facilitate implementing the updated architecture diagram 300 to resolve any of the issues that were previously provide detected. For example, the analysis engine 108 may provide instructions or commands for replacing features 302 that are associated with issues with the identified alternative features 302. For instance, the analysis engine 108 may send instructions to a network device 104 that identifies non-compliant features 302 and corresponding alternative features 302 that can be used to replace the non-compliant features 302.

Analysis Device Hardware Configuration

Figure 5:
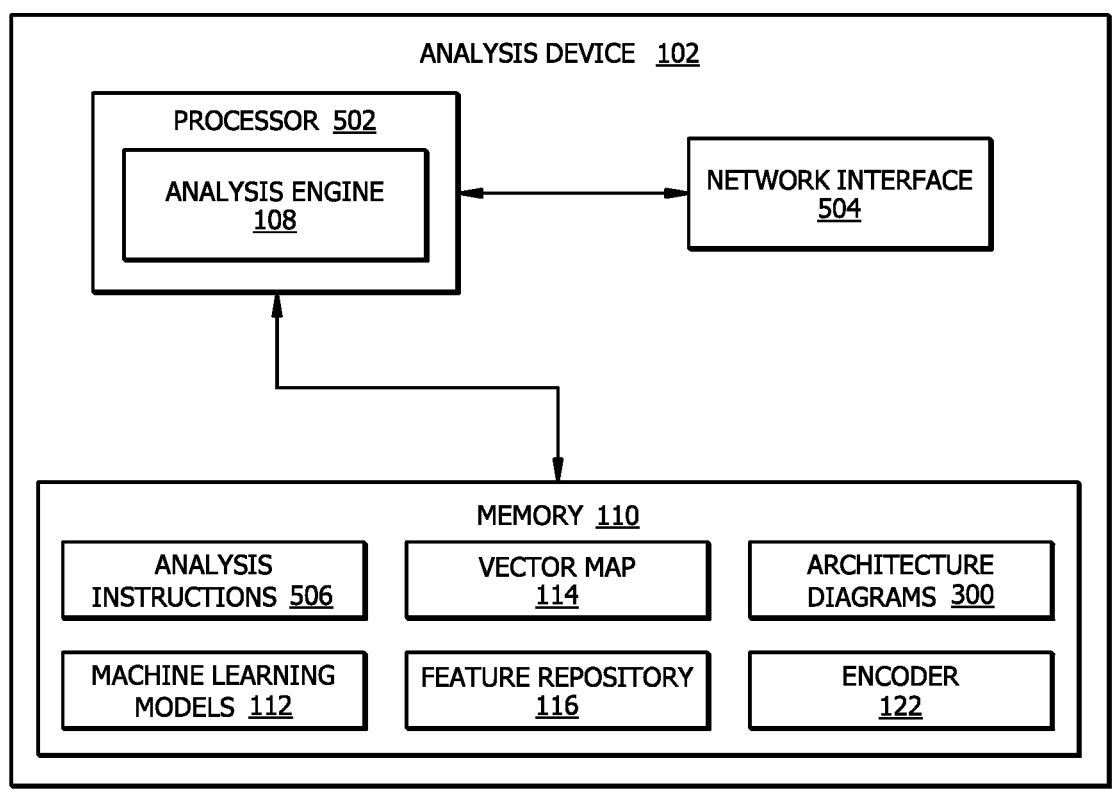
FIG. 5 is a schematic diagram of an embodiment of a device configured to analyze an architecture diagram.

FIG. 5 is a schematic diagram of an embodiment of a device (e.g. analysis device 102) configured to analyze an architecture diagram. The analysis device 102 comprises a processor 502, a memory 110, and a network interface 504. The system healing device 102 may be configured as shown or in any other suitable configuration.

The processor 502 comprises one or more processors operably coupled to the memory 110. The processor 502 is any electronic circuitry including, but not limited to, state machines, one or more central processing unit (CPU) chips, logic units, cores (e.g. a multi-core processor), field-programmable gate array (FPGAs), application-specific integrated circuits (ASICs), or digital signal processors (DSPs). The processor 502 may be a programmable logic device, a microcontroller, a microprocessor, or any suitable combination of the preceding. The processor 502 is communicatively coupled to and in signal communication with the memory 110. The one or more processors are configured to process data and may be implemented in hardware or software. For example, the processor 502 may be 8-bit, 16-bit, 32-bit, 64-bit, or of any other suitable architecture. The processor 502 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute analysis instructions 506 to implement an analysis engine 108. In this way, processor 502 may be a special-purpose computer designed to implement the functions disclosed herein. In an embodiment, the analysis engine 108 is implemented using logic units, FPGAs, ASICs, DSPs, or any other suitable hardware. The analysis engine 108 is configured to operate as described in FIGS. 1 and 2. For example, the analysis engine 108 may be configured to perform the steps of method 200 as described in FIG. 2.

The memory 110 comprises one or more disks, tape drives, or solid-state drives, and may be used as an over-flow data storage device, to store programs when such programs are selected for execution, and to store instructions and data that are read during program execution. The memory 110 may be volatile or non-volatile and may comprise a read-only memory (ROM), random-access memory (RAM), ternary content-addressable memory (TCAM), dynamic random-access memory (DRAM), and static random-access memory (SRAM).

The memory 110 is operable to store analysis instructions 506, machine learning models 112, vector maps 114, a feature repository 116, architecture diagrams 300, an encoder 122, and/or any other data or instructions. The analysis instructions 506 may comprise any suitable set of instructions, logic, rules, or code operable to execute the analysis engine 108. The machine learning models 112, vector maps 114, feature repository 116, architecture diagram 300, and encoder 122 are configured similar to the machine learning models 112, vector maps 114, feature repository 116, architecture diagrams 300, and encoder 122 described in FIGS. 1 and 2, respectively.

The network interface 504 is configured to enable wired and/or wireless communications. The network interface 504 is configured to communicate data between the system healing device 102 and other devices (e.g. network devices 104), systems, or domain. For example, the network interface 504 may comprise a WIFI interface, a LAN interface, a WAN interface, a modem, a switch, or a router. The processor 502 is configured to send and receive data using the network interface 504. The network interface 504 may be configured to use any suitable type of communication protocol as would be appreciated by one of ordinary skill in the art.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. An architecture diagram analysis device, comprising:
a memory operable to store a machine learning model configured to classify an input as either compliant or non-compliant; and
a processor operably coupled to the memory, configured to:
obtain an architecture diagram comprising graphical representations of a plurality of features that are configured to form a workflow for a computer system, wherein the plurality of features comprises:
a plurality of components comprising software applications and hardware components; and
communication channels between the plurality of components;
identify the plurality of features within the architecture diagram;
identify metadata that is associated with the identified features, wherein:
the metadata comprise text associated with the identified features and location information for the identified features within the architecture diagram; and
the location information comprises information identifying where a feature is located within the architecture diagram;
convert the identified features into vector points based on the identified metadata, wherein:
a vector point is a point in an n-dimensional space; and
the number of dimensions in the n-dimensional space is based on the number of features in the architecture diagram;
generate a vector map, wherein the vector map is configured to associate a vector point with its corresponding metadata;
input the vector points into the machine learning model;
obtain classification results for the vector points in response to inputting the vector points into the machine learning model, wherein the classification results associate each vector point with one of a compliant classification and a non-compliant classification;
identify vector points that are associated with a non-compliant classification;
identify one or more non-compliant features corresponding with the vector points that are associated with a non-compliant classification;
identify alternative features for the one or more non-compliant features, wherein each alternative feature is one of a software application and a hardware component;
update the vector map by replacing the one or more non-compliant features with the alternative features; and
update the architecture diagram based on the updated vector map, wherein updating the architecture diagram replaces graphical representations of the one or more non-compliant features with graphical representations of the alternative features in the architecture diagram.

2. The device of claim 1, wherein:
the processor is further configured to perform a clustering analysis comprising:
generating a plot of the vector points within the n-dimensional space;
determining a number of clusters within the plot;
determining the number of clusters exceeds a predetermined threshold value; and
determining that the vector points comprise one or more non-compliant features in response to determining that the number of clusters exceeds the predetermined threshold value; and
inputting the vector points into the machine learning model is in response to determining that the vector points comprise one or more non-compliant featured based on the clustering analysis.

3. The device of claim 1, wherein:
the memory further comprises a feature repository that is configured to associates non-compliant features with compliant features; and
identifying the alternative features comprises identify compliant features that correspond with the one or more non-compliant features in the feature repository.

4. The device of claim 1, wherein updating the architecture diagram comprises:
identifying location information for a non-compliant feature in the vector map;
identifying a graphical representation of the non-compliant feature in the architecture diagram based on the location information; and
replacing the graphical representation of the non-compliant feature with a graphical representation of an alternative feature in the architecture diagram.

5. The device of claim 1, wherein identifying the one or more non-compliant features corresponding with the vector points that are associated with a non-compliant classification comprises highlighting the one or more non-compliant features in the architecture diagram.

6. The device of claim 5, wherein highlighting the one or more non-compliant features in the architecture diagram comprises:
identifying location information for a non-compliant feature in the vector map; and
modifying the graphical representation of the non-compliant feature in the architecture diagram.

7. The device of claim 1, wherein processor is further configured to output instructions for replacing non-compliant features with alternative features.

8. An architecture diagram analysis method for a computing system infrastructure, comprising:

obtaining an architecture diagram comprising graphical representations of a plurality of features that are configured to form a workflow for a computer system, wherein the plurality of features comprises:
   a plurality of components comprising software applications and hardware components; and
   communication channels between the plurality of components;
identifying the plurality of features within the architecture diagram;
identifying metadata that is associated with the identified features, wherein:
   the metadata comprise text associated with the identified features and location information for the identified features within the architecture diagram; and
   the location information comprises information identifying where a feature is located within the architecture diagram;
converting the identified features into vector points based on the identified metadata, wherein:
   a vector point is a point in an n-dimensional space; and
   the number of dimensions in the n-dimensional space is based on the number of features in the architecture diagram;
generating a vector map, wherein the vector map is configured to associate a vector point with its corresponding metadata;
inputting the vector points into a machine learning model that is configured to classify an input as either compliant or non-compliant;
obtaining classification results for the vector points in response to inputting the vector points into the machine learning model, wherein the classification results associate each vector point with one of a compliant classification and a non-compliant classification;
identifying vector points that are associated with a non-compliant classification;
identifying one or more non-compliant features corresponding with the vector points that are associated with a non-compliant classification;
identifying alternative features for the one or more non-compliant features, wherein each alternative feature is one of a software application and a hardware component;
updating the vector map by replacing the one or more non-compliant features with the alternative features; and
updating the architecture diagram based on the updated vector map, wherein updating the architecture diagram replaces graphical representations of the one or more non-compliant features with graphical representations of the alternative features in the architecture diagram.

9. The method of claim 8, further comprising performing a clustering analysis comprising:
   generating a plot of the vector points within the n-dimensional space;
   determining a number of clusters within the plot;
   determining the number of clusters exceeds a predetermined threshold value; and
   determining that the vector points comprise one or more non-compliant features in response to determining that the number of clusters exceeds the predetermined threshold value; and
   wherein inputting the vector points into the machine learning model is in response to determining that the vector points comprise one or more non-compliant featured based on the clustering analysis.

10. The method of claim 8, further comprising identifying the alternative features comprises identify compliant features that correspond with the one or more non-compliant features in a feature repository, wherein the feature repository is configured to associate non-compliant features with compliant features.

11. The method of claim 8, wherein updating the architecture diagram comprises:
   identifying location information for a non-compliant feature in the vector map;
   identifying a graphical representation of the non-compliant feature in the architecture diagram based on the location information; and
   replacing the graphical representation of the non-compliant feature with a graphical representation of an alternative feature in the architecture diagram.

12. The method of claim 8, wherein identifying the one or more non-compliant features corresponding with the vector points that are associated with a non-compliant classification comprises highlighting the one or more non-compliant features in the architecture diagram.

13. The method of claim 12, wherein highlighting the one or more non-compliant features in the architecture diagram comprises:
   identifying location information for a non-compliant feature in the vector map; and
   modifying the graphical representation of the non-compliant feature in the architecture diagram.

14. The method of claim 8, further comprising outputting instructions for replacing non-compliant features with alternative features.

15. A computer program comprising executable instructions stored in a non-transitory computer readable medium that when executed by a processor causes the processor to:
   obtain an architecture diagram comprising graphical representations of a plurality of features that are configured to form a workflow for a computer system, wherein the plurality of features comprises:
      a plurality of components comprising software applications and hardware components; and
      communication channels between the plurality of components;
   identify the plurality of features within the architecture diagram;
   identify metadata that is associated with the identified features, wherein:
      the metadata comprise text associated with the identified features and location information for the identified features within the architecture diagram; and
      the location information comprises information identifying where a feature is located within the architecture diagram;
   convert the identified features into vector points based on the identified metadata, wherein:
      a vector point is a point in an n-dimensional space; and
      the number of dimensions in the n-dimensional space is based on the number of features in the architecture diagram;
   generate a vector map, wherein the vector map is configured to associate a vector point with its corresponding metadata;
   input the vector points into a machine learning model that is configured to classify an input as either compliant or non-compliant;
   obtain classification results for the vector points in response to inputting the vector points into the machine learning model, wherein the classification results associate each vector point with one of a compliant classification and a non-compliant classification;

identify vector points that are associated with a non-compliant classification;

identify one or more non-compliant features corresponding with the vector points that are associated with a non-compliant classification;

identify alternative features for the one or more non-compliant features, wherein each alternative feature is one of a software application and a hardware component;

update the vector map by replacing the one or more non-compliant features with the alternative features; and update the architecture diagram based on the updated vector map, wherein updating the architecture diagram replaces graphical representations of the one or more non-compliant features with graphical representations of the alternative features in the architecture diagram.

16. The computer program of claim 15, further comprising instructions that when executed by the processor causes the processor to perform a clustering analysis comprising:
generating a plot of the vector points within the n-dimensional space;
determining a number of clusters within the plot;
determining the number of clusters exceeds a predetermined threshold value; and
determining that the vector points comprise one or more non-compliant features in response to determining that the number of clusters exceeds the predetermined threshold value; and
wherein inputting the vector points into the machine learning model is in response to determining that the vector points comprise one or more non-compliant featured based on the clustering analysis.

17. The computer program of claim 15, further comprising instructions that when executed by the processor causes the processor to identify the alternative features comprises identify compliant features that correspond with the one or more non-compliant features in a feature repository, wherein the feature repository is configured to associate non-compliant features with compliant features.

18. The computer program of claim 15, wherein updating the architecture diagram comprises:
identifying location information for a non-compliant feature in the vector map;
identifying a graphical representation of the non-compliant feature in the architecture diagram based on the location information; and
replacing the graphical representation of the non-compliant feature with a graphical representation of an alternative feature in the architecture diagram.

19. The computer program of claim 15, wherein:
identifying the one or more non-compliant features corresponding with the vector points that are associated with a non-compliant classification comprises highlighting the one or more non-compliant features in the architecture diagram; and
highlighting the one or more non-compliant features in the architecture diagram comprises:
identifying location information for a non-compliant feature in the vector map; and
modifying the graphical representation of the non-compliant feature in the architecture diagram.

20. The computer program of claim 15, further comprising instructions that when executed by the processor causes the processor output instructions for replacing non-compliant features with alternative features.

* * * * *